Patented Aug. 10, 1937

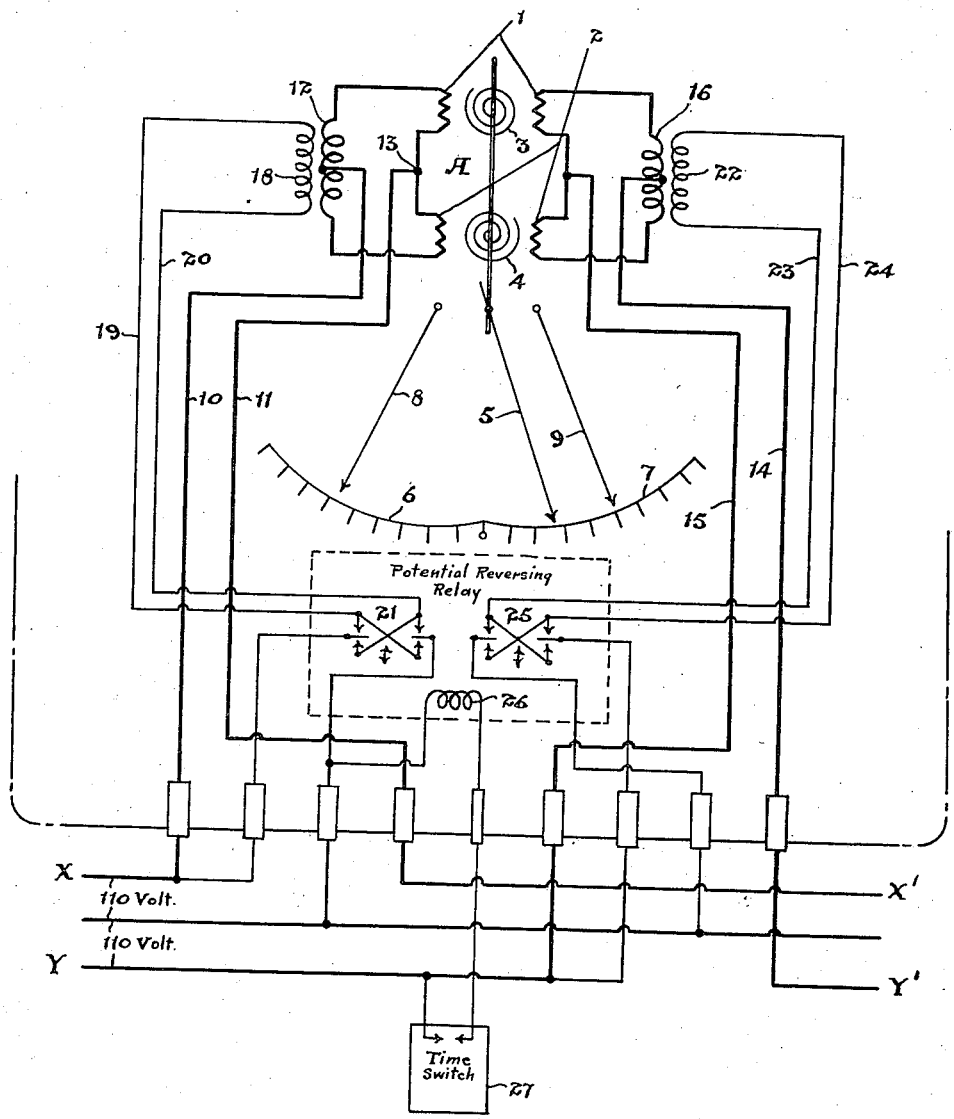

2,089,631

UNITED STATES PATENT OFFICE 2,089,631

SELECTIVE DEMAND METER AND METHOD OF MEASUREMENT OF ELECTRIC CURRENT

Griffin G. Waite, Toronto, Ontario, Canada, assignor to Sangamo Company Limited, Toronto, Ontario, Canada Application January 6, 1936, Serial No. 57,704

5 Claims. (Cl. 171—95)

In the measurement of consumption of electric current it is highly desirable that the consumer be encouraged in the use of power in "off peak" periods and that separate records be kept of the power used in both "off peak" and "peak load" periods.

At present such measurement is accomplished by the use of two meters, one being a special meter to be cut into the circuit for the period when the system demand is a maximum. The other meter records the consumption of current during the remaining or "off peak" period of the day.

It will be readily appreciated that such an arrangement necessitates a very considerable capital outlay on the part of the power distributor, that is, in supplying the customer with two meters instead of one and the principal object of this invention is to devise a method of measurement of power consumption which will selectively measure the power demand in "on" and "off" peak loads, thereby effecting a very marked economy to both the distributor and the consumer.

The principal feature of the invention consists in the novel arrangement of a pair of maximum indicating members to be operated by a meter-actuated element having a centre zero indicator adapted to swing to either side to operate the separate demand indicators and providing means for the reversal of potential of the central indicator operating means.

The drawing is a diagrammatic illustration of a polyphase thermal demand watt meter arranged for carrying this invention into effect in connection with the measurement of A. C. power.

Referring to the accompanying drawing, the polyphase meter A, which is of the thermal type, commonly known as the "Lincoln" thermal meter, is provided with two sets of heaters 1 and 2 which influence the oppositely-wound spiral coils 3 and 4 respectively and control the operation of the centre zero indicator finger 5 which swings either to right or left over the scales 6 and 7 respectively.

Pointers 8 and 9 are pivotally mounted adjacent to the pivot point of the centre indicator 5 and are engaged by said centre indicator and moved over their respective scales to indicate the maximum demand of the current used in the swinging of the indicator 5 either to right or left of the zero position.

The operation of the "Lincoln" thermal demand type of meter is well known to those skilled in the art, (and in this connection reference may be had to Lincoln Patent 1,156,412, dated October 12th, 1915). The leads 10 and 11 from the service lines X—X' are connected respectively to a mid-point in the coil 12 and the mid-point 13 between the heaters 1 and 2.

The leads 14 and 15 are connected from the service lines Y—Y' to the mid-point of the coil 16 and the mid-point 17 between the other pair of heaters 1 and 2 of the meter A respectively.

The potential coil 18 is inductively associated with coil 12 and is connected through the leads 19 and 20 to the relay switch 21 and the potential coil 22 is inductively associated with the coil 16 and is connected through the leads 23 and 24 to the relay switch 25.

The switches 21 and 25 are of the ordinary type of potential reversing relay and the switching elements thereof are actuated by the coil 26 which is energized or de-energized by the operation of the time switch 27, which may be incorporated in the meter structure or may be external thereto.

It is not considered necessary to describe in detail the structure of the potential reversing relay switches, which when the coil 26 is de-energized, normally rest in one position to direct a flow of current in one direction in coils 18 and 22 and when energized, are moved to a position in the reverse direction to direct a flow of current through their respective coils 18 and 22.

The time switch 27 may be set so that the coil 26 is de-energized during a certain "off peak" period of the day and when the "peak load" period arrives, the time switch closes to energize the coil 26 and to operate the reversing relay. During the "off peak" period, the torque of the meter controls the operation of the centre indicator 5, swinging it in accordance with the power consumed to one side of the centre or zero position so as to move the indicator finger 8 or 9, as the case may be.

When the time for changing the recording of current consumption from "off peak" to "peak load" occurs, the switch 27 operates the potential reversing relay to reverse the torque of the meter thereby operating the indicator 5 to engage the other demand indicator which has previously been idle and moves it on its scale.

When the "peak load" period has passed, the time switch will again operate through the potential reversing relay to change over the operation of the centre swinging indicator, so that it again registers on the "off peak" side of the indicator scale.

It will be readily understood by those skilled in the art that the system of measurement of the consumption of electric current as herein set forth is not dependent upon exact construction of apparatus as herein described, nor is the particular type of meter shown a requisite, as the system will operate successfully with any centre zero meter, that is to say, any meter with a centre zero position and having registering scales on either side, and by the reversal of the potential the single indicator will operate selectively to either side of such zero position.

The time switch may be entirely a time period regulated device, or it may be operated by remote control in any well known manner.

It will be readily understood that the building of a single meter having its actuating elements arranged to operate either side of a central zero mark and incorporating into the meter structure a potential reversing relay, will be a much simpler and less expensive form of measuring and recording device for the consumption of electric current than the use of two separate meters. The latter of course necessitates the use of a transfer relay or a time or remote control switch.

The result of such a method of measuring the consumption of current reduces the initial cost in meters and also in the cost of their installation and the scale can be so clearly marked as "peak load" and "off peak" load, that the consumer may readily ascertain how his load has been carried.

What I claim as my invention is:

1. A selective demand meter comprising a meter actuated center zero indicator, additional indicators arranged adjacent to the zero position of said first named indicator and adapted to be selectively operated thereby, and means for controlling the direction of movement of said central indicator including means for shifting said indicator to either side of the center zero position.

2. A selective demand meter having a center zero indicator with scale markings at opposite sides of a central zero mark representing respectively "peak" and "off peak" indications, and means for actuating said indicator to move in either direction away from the central zero position toward the "peak" or "off peak" markings during "peak" or "off peak" periods respectively, and individual indicators co-operating respectively with said "peak" and "off peak" scale markings and arranged adjacent to said center indicator to be operated thereby.

3. A selective demand meter as claimed in claim 2 in which said means for actuating said center zero indicator includes means for shifting the meter operating potential to influence said center zero indicator to operate on opposite sides of said center zero mark.

4. A selective demand meter having a center zero indicator, means for actuating said indicator to move to either side of its zero position, potential elements, a reversing relay connected with said potential elements, means for controlling the operation of said reversing relay, and individual indicators arranged at either side of the zero position of the center indicator and operated thereby.

5. A selective demand meter comprising a two-element polyphase meter having a center zero indicator adapted to swing to either side of zero, indicators arranged at either side of and operated by said center indicator, potential coils forming part of each of said meter elements, a potential reversing relay connected with said potential coils and having an actuating coil, and a control switch wired to said actuating coil.

GRIFFIN G. WAITE.